H. A. SIEGRIST.
SIGNAL FOR AUTOMOBILES.
APPLICATION FILED AUG. 1, 1910.

1,151,834.

Patented Aug. 31, 1915.

Attest
A. J. McCauley

Inventor:
Henry A. Siegrist
by Rippey & Kingsland
Attys.

UNITED STATES PATENT OFFICE.

HENRY A. SIEGRIST, OF ST. LOUIS, MISSOURI, ASSIGNOR OF FORTY-FIVE ONE-HUNDREDTHS TO C. H. DUDLEY, OF ST. LOUIS, MISSOURI.

SIGNAL FOR AUTOMOBILES.

1,151,834.     Specification of Letters Patent.     Patented Aug. 31, 1915.

Application filed August 1, 1910. Serial No. 575,015.

*To all whom it may concern:*

Be it known that I, HENRY A. SIEGRIST, a citizen of the United States, residing at St. Louis, State of Missouri, have invented a new and useful Improvement in Signals for Automobiles, of which the following is a specification.

This invention relates to automobiles, and more specifically to signal devices mounted thereon and operable or adjustable for various purposes, such, for instance, as indicated or signaling that the speed is being increased or reduced, etc. An appliance of this character is useful on automobiles, which are in use on crowded thoroughfares, to indicate or signal to others following that the speed is about to be changed. This will enable the following vehicles to be regulated as to speed, so as to avoid all danger of collision or accident.

In the embodiment of my invention illustrated in the accompanying drawings I have shown the signal mounted at the rear of the automobile and illuminated by a lamp so that the signal may be plainly seen even during the night. The illumination of the signal is of considerable value and importance since it permits the use of the device in all of its functions under all conditions. Also the signal and lamp are shown on a single support which may be oscillated so as to carry the signal to inoperative or idle adjustment at the side, in which position it is practically invisible from the rear; and the signal may also be moved to position rearwardly from the lamp, so as to be plainly visible to any one behind the vehicle carrying the signal, and being illuminated by the lamp so that it may be easily observed at night.

It will be understood that I do not restrict myself to the identical arrangement shown, nor to the actuating appliances, for other arrangements and means of actuating the signal will readily be suggested by the embodiment herein disclosed.

Figure 1:
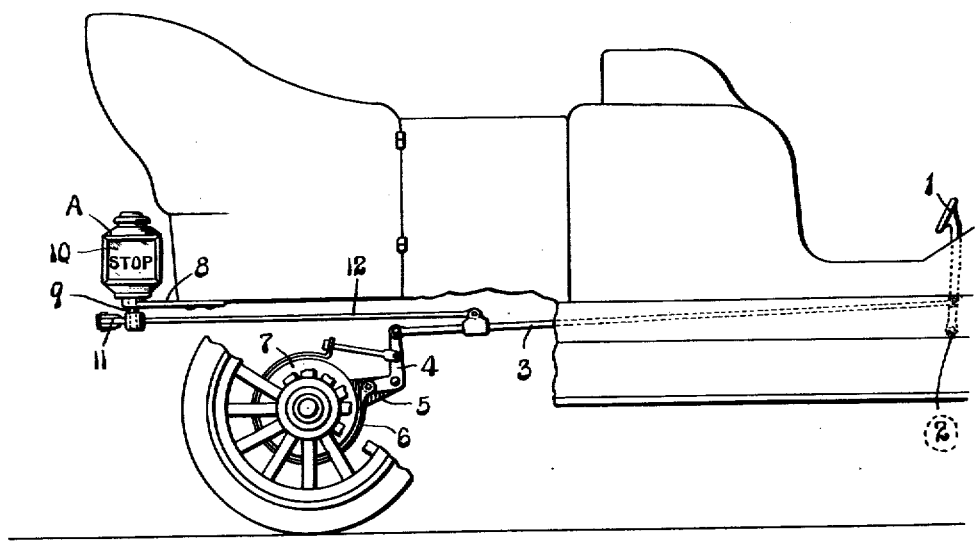
Figure 2:
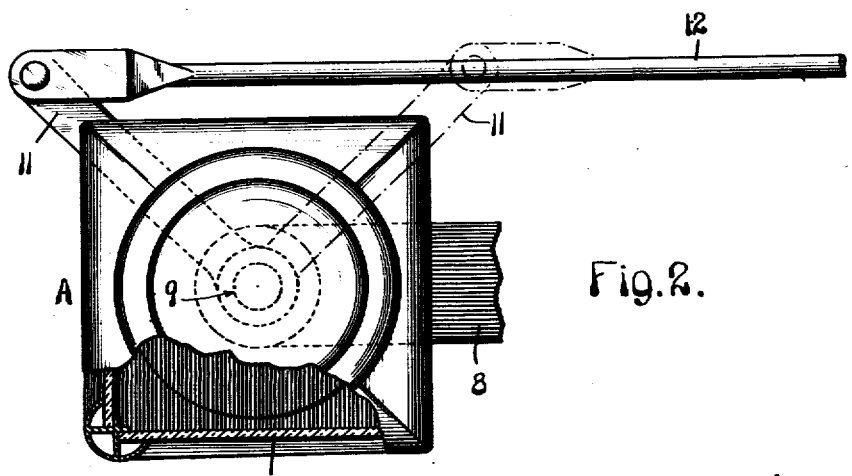

In the drawings, Figure 1 is a conventional illustration of the tonneau of an automobile, the brake mechanism and the appliances for operating said mechanism being clearly shown with a connection for operating the signal mounted at the rear of the tonneau. Fig. 2 is a detail view of the signal support.

In the embodiment illustrated the brake lever 1 is mounted on a pivot 2, in position for convenient manipulation by the chauffeur. A link 3 connects the lever 1 with a lever 4 pivoted upon a support 5, said lever being connected with the brake-band 6 which encircles the brake-disk 7 and acts in the well known way for braking purposes. At the rear of the automobile a bracket 8 is attached. A spindle 9 is rotatably supported by said bracket and carries a lamp A intended to be lighted at night, or at such times as may be desirable. On one of the sides of the lamp case is a sign, symbol, or word, as shown at 10, which constitutes a signal to inform others following the vehicle, of any reduction in the speed of said vehicle. Normally this sign is at the side of the lamp as shown in Fig. 1, but may be turned so as to be visible from the rear. This movement of the signal is effected automatically by operation of the brake. A crank arm 11 is rigid with the spindle 9, and is connected with the link 3 by a connecting rod 12.

From the foregoing it is obvious that the signal is controlled automatically by the brake actuating or setting appliances, and this may be effected by any kind of appliances used for such purposes. When the speed of the vehicle is reduced by application of the brakes the signal will be automatically turned so as to be plainly seen by, and constitute a warning to, others following, thereby enabling them to avoid all danger of collision. Since the signal is located near the lamp and is illuminated thereby, it will be plainly seen at night when there is, perhaps, the greatest use for it.

I am aware that there may be various modifications in the construction and arrangement of the parts without departing from the spirit and scope of the invention. The signal may be mounted in any position at the rear, and may be actuated and controlled by any devices in the brake actuating mechanism. These variations, within equivalent limits, are embraced within the scope of my invention. I do not restrict myself to exact or identical features of construction, but

What I claim and desire to secure by Letters Patent is—

An indicating signal for automobiles including an illuminated signal having a distinctive characteristic on one face thereof, means for supporting said signal from the automobile for horizontal rotary movement, an automobile brake element, an operating rod therefor to be actuated by the driver, and a connection intermediate said rod and the signal-supporting means whereby the position of the distinctive characteristic of the signal will at all times indicate the condition of the brake element.

In witness whereof, I have signed this specification in the presence of two subscribing witnesses.

HENRY A. SIEGRIST.

Witnesses:
L. C. KINGSLAND,
J. D. RIPPEY.

It is hereby certified that the name of the assignee in Letters Patent No. 1,151,834, granted August 31, 1915, upon the application of Henry A. Siegrist, of St. Louis, Missouri, for an improvement in "Signals for Automobiles," was erroneously written and printed "C. H. Dudley," whereas said name should have been written and printed *G. H. Dudley;* and that the said Letters Patent should be read with this correction therein that the same may conform to the record of the case in the Patent Office.

Signed and sealed this 12th day of October, A. D., 1915.

[SEAL.] R. F. WHITEHEAD,

*Acting Commissioner of Patents.*

Cl. 116—31.